United States Patent [19]

Ballocca

[11] Patent Number: 4,584,150

[45] Date of Patent: Apr. 22, 1986

[54] METHOD FOR THE CONTINUOUS EXTRUSION OF AN EXTRUSION, PARTICULARLY A WEATHER STRIP FOR MOTOR VEHICLE BODIES

[75] Inventor: Guido Ballocca, Turin, Italy

[73] Assignee: S.A.I.A.G. S.p.A., Turin, Italy

[21] Appl. No.: 560,055

[22] Filed: Dec. 9, 1983

[30] Foreign Application Priority Data

Dec. 10, 1982 [IT] Italy .............................. 68449 A/82

[51] Int. Cl.⁴ .......................................... B28B 23/02
[52] U.S. Cl. .................... 264/40.1; 264/40.2; 264/167; 264/177 R; 425/135
[58] Field of Search .............. 264/40.1, 40.2, 40.5, 264/40.7, 167, 177 R; 425/145, 376 A, 135, 113, 381, 142, 155

[56] References Cited

U.S. PATENT DOCUMENTS

| Re. 29,886 | 1/1979 | Dembiak et al. | 264/40.5 |
|---|---|---|---|
| 2,649,618 | 8/1953 | Rhodes et al. | 425/142 |
| 3,067,455 | 12/1962 | Reid | 264/171 |
| 3,422,648 | 1/1969 | Lemelson | 425/155 |
| 3,502,752 | 3/1970 | Brown | 264/40.2 |
| 3,550,203 | 12/1970 | Lemelson | 425/142 |
| 3,557,403 | 1/1971 | Lemelson | 425/142 |
| 3,649,730 | 3/1972 | Benteler et al. | 264/40.7 |
| 3,655,310 | 4/1972 | Smith et al. | 425/155 |
| 3,825,459 | 7/1974 | Taylor | 264/177 R |
| 3,923,439 | 12/1975 | Isley et al. | 425/381 |
| 3,928,519 | 12/1975 | Kashiyama et al. | 264/40.7 |
| 4,081,504 | 3/1978 | Wenrick et al. | 264/177 R |
| 4,093,499 | 6/1978 | Naka | 425/113 |
| 4,120,630 | 10/1978 | LaSpisa et al. | 425/142 |
| 4,257,991 | 3/1981 | Kirjavainen | 425/113 |
| 4,261,940 | 4/1981 | Bussey, Jr. | 425/155 |
| 4,280,801 | 7/1981 | Wheeler, Jr. et al. | 425/376 A |
| 4,281,978 | 8/1981 | Shigematsu | 264/167 |
| 4,340,554 | 7/1982 | Bardwell | 264/40.7 |
| 4,379,102 | 4/1983 | Kertscher | 264/40.7 |
| 4,381,273 | 4/1983 | Azzola | 264/173 |
| 4,439,125 | 3/1984 | Dieckmann et al. | 425/376 A |

Primary Examiner—Donald Czaja
Assistant Examiner—Mary Lynn Fertig
Attorney, Agent, or Firm—Sughrue, Mion, Zinn, Macpeak & Seas

[57] ABSTRACT

The method consists of:
providing an elongate member (tracer) of a material which is substantially inextensible or extensible to a foreseeable extent,
feeding the member to the extrusion head of an extruder simultaneously with the material to be extruded so that the member is incorporated in the extrusion during extrusion,
detecting the advance of the member upstream of the extrusion head, and
synchronizing the operation of adjusting means operable to modify the section of the outlet orifice of the extrusion head with the advance of the member.

The invention also relates to apparatus for carrying out the method.

6 Claims, 12 Drawing Figures

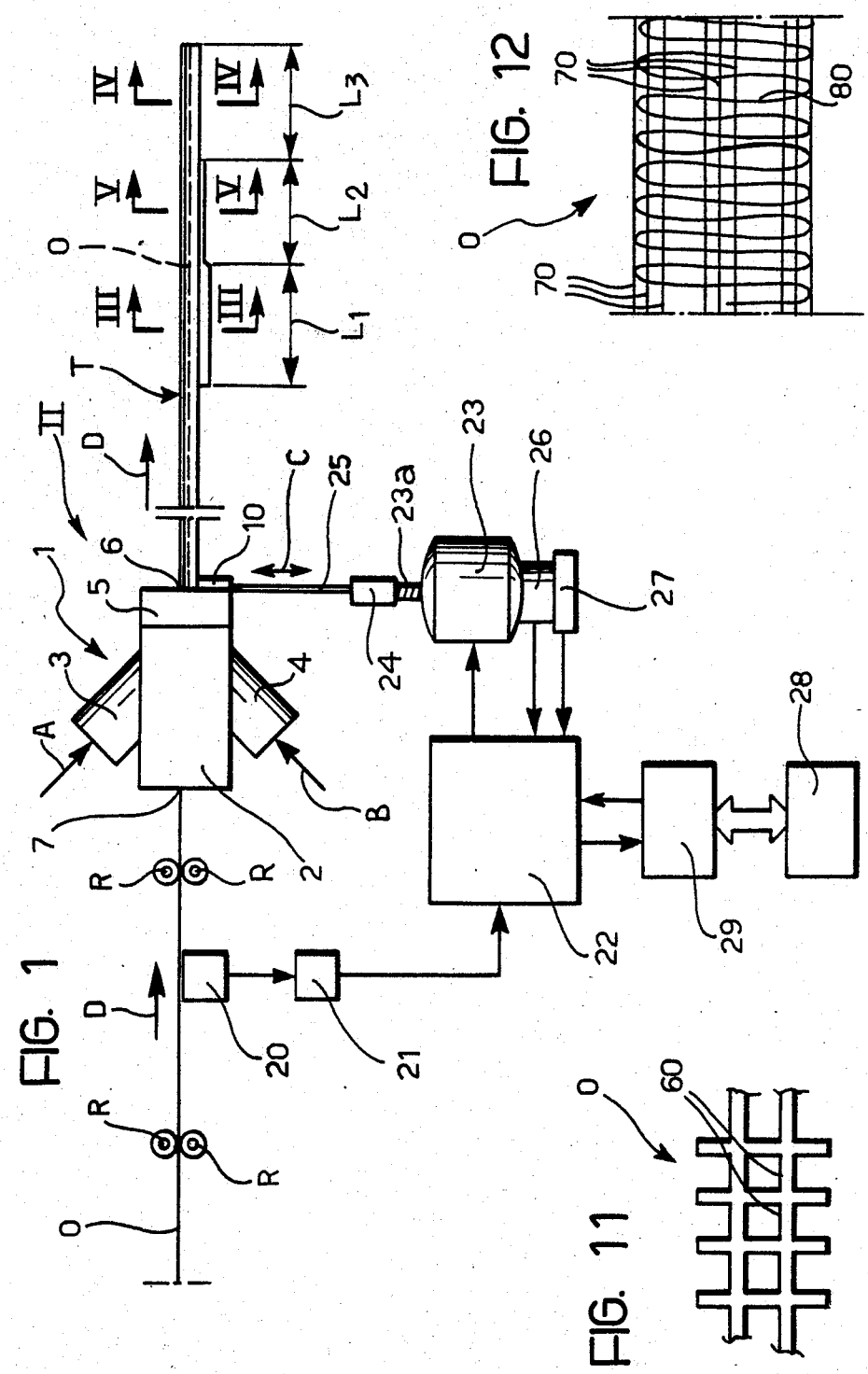

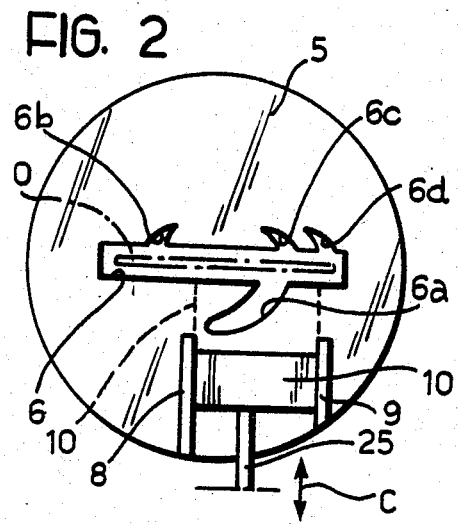
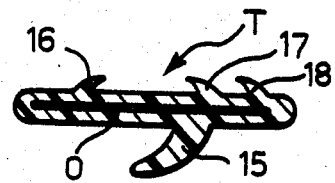
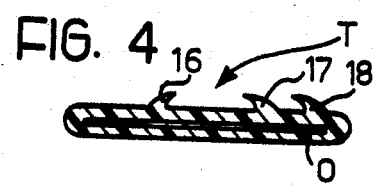
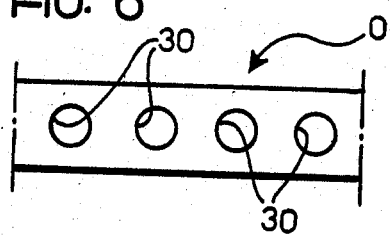
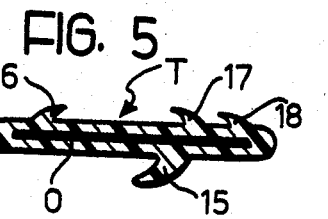
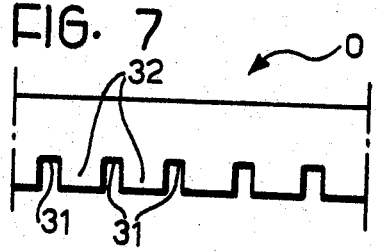
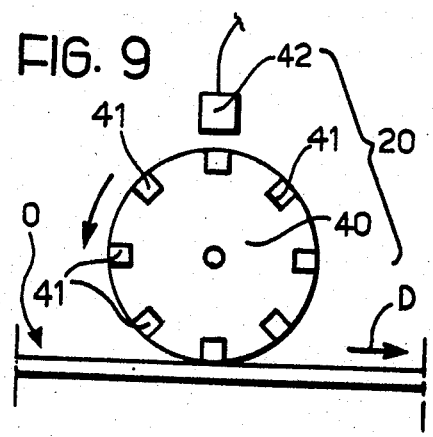
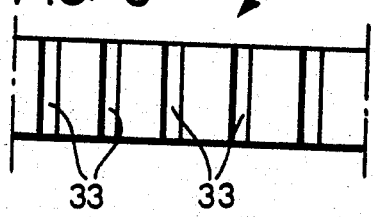
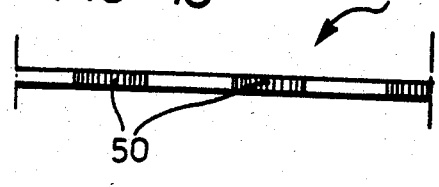

METHOD FOR THE CONTINUOUS EXTRUSION OF AN EXTRUSION, PARTICULARLY A WEATHER STRIP FOR MOTOR VEHICLE BODIES

The present invention relates to a method of forming an extruded section, particularly a weather strip for motor vehicle bodies.

The use of weather strips is very widespread, particularly for motor vehicle bodies, the strips being constituted by a solid, cellular or composite elastomeric material which can be fitted to the edges of apertures or closure elements, such as doors, hatches etc.

In order to ensure an effective sealing action along the entire edge to which such a strip is applied, particularly in critical locations where, for example, the profile to which the strip is applied has sharp variations of curvature, it has been proposed to form the weather strip with various successive portions of predetermined length having respective predetermined sections adapted to ensure sealing in the zone of the edge of the aperture or door to which each individual portion is intended to be applied.

The possibility of forming strips with modified sections in predetermined locations may sometimes result from aesthetic requirements, however, in the sense that, in order to improve the exterior appearance of the product provided with the strip, it may be convenient for some longitudinal portions of the strip to have a section or profile which is different from the remaining part.

Strips have thus been proposed with longitudinal sealing projections of tubular form or tab form, having a predetermined cross-section depending on the characteristics of the portion of the edge to which the strip is to be applied.

In the case, for example, of sealing projections of tab form, it is known to form the weather strips by continuous extrusion with a substantially constant cross-section, the sealing projection having a constant section equal to the maximum section envisaged. After extrusion, in those portions of the strip in which, for better adaptation to the profile to which the strip is to be applied, it is convenient for the sealing tab to have a smaller size or to be absent, the tab is reduced or removed by slicing or die-cutting.

This method has various disadvantages. First of all, it involves a not-inconsiderable wastage of material. In the second place, the variation in the section of the strip achieved by slicing or die-cutting after extrusion involves a considerable amount of time and hence raises the cost of the finished product.

Moreover, if the strip is constituted entirely or partly by cellular material, it may be quite impossible to vary the section by slicing or die-cutting, in that this would result in a deterioration of the strip both from a functional and an aesthetic point of view: in correspondence with the zones in which the strip is cut, the surface porosity would make it possible for the strip to absorb moisture or water, with a reduction in the sealing action and the life of the strip and a deterioration in its external appearance.

The object of the present invention is to enable the formation of an extruded member by continuous extrusion in a simple, rapid, economical, precise and reliable manner, with the extrusion having successive portions of predetermined length each of which has a respective predetermined section, by the use of an extrusion head having adjusting means which, when actuated, modify the section of the extrusion orifice.

This object is achieved according to the invention by a method the main characteristic of which lies in the fact that it comprises the following operations:

providing an elongate member of a material which is substantially inextensible or extensible to a foreseeable extent, feeding the member to the extrusion head simultaneously with the material to be extruded so that the member is incorporated in the extrusion during extrusion, detecting the advance of the member upstream of the extrusion, and synchronising the operation of the adjusting means with the advance of the member.

According to a further characteristic of the method the said member may be provided with marks or references regularly spaced longitudinally of this member and the advance of this member is detected by means of the detection of the passage of the marks or references at a fixed position upstream of the extrusion head.

The invention further provides apparatus for synchronising the variations in section of an extrusion with the advance of the extrusion from an extruder provided with adjusting means arranged, when operated, to modify the section of the outlet orifice of its extrusion head, the apparatus being characterised in that it comprises:

an elongate member of a material which is substantially inextensible or extensible to a foreseeable extent, for feeding to the extrusion head simultaneously with the material to be extruded so that the member is incorporated in the extrusion during extrusion, detector means located upstream of the extrusion head for detecting the advance of the member, and control and drive means connected to the detector means and the adjusting means and arranged to operate the adjusting means in a predetermined manner in dependence on the advance of the member.

Further characteristics and advantages of the invention will become apparant from the detailed description which follows with reference to the appended drawings, provided purely by way of nonlimiting example, in which:

FIG. 1 shows apparatus according to the invention for carrying out the method of the invention, FIG. 2 is a front view of an extrusion die forming part of the apparatus illustrated in FIG. 1, taken on arrow II of FIG. 1, FIGS. 3 to 5 are cross-sections taken on lines III—III, IV—IV, V—V of FIG. 1, showing three portions of a strip obtained with the apparatus of FIG. 1, FIGS. 6 to 8 are views from above of three embodiments of a tracer member for use in the method and apparatus according to the invention, FIG. 9 shows a further embodiment of the member and means for detecting its advance, and FIGS. 10 to 12 show three further embodiments of this member.

With reference to FIG. 1, an extrusion head of an extruder of known type is generally indicated 1. This head comprises a body 2 to which are connected two ducts 3, 4 through which a material to be extruded, for example, a solid or cellular elastomeric material, is fed to the body in operation in the direction indicated by the arrows A and B. To one end of the body 2 is fixed an extrusion die 5 shown in greater detail in FIG. 2. The die has an aperture or orifice 6 for imparting the desired cross-section to the extruded material.

At the opposite end to the die 5, the body 2 has a further inlet aperture indicated 7 in FIG. 1.

As shown in FIG. 2, on the front free face of the die 5 there is provided a pair of guides 8, 9 between which a shutter 10 is movable. More particularly, this shutter is movable in contact with the die 5 in the direction indicated by the arrows C.

In the embodiment shown in FIG. 2, the outlet orifice 6 has a substantially rectangular perimeter and the lower longer side of this perimeter has a substantially V-shaped notch 6a. The upper longer side of the perimeter of the orifice 6, in the embodiment illustrated, has three further notches 6b, 6c, 6d, which are also V-shaped, as shown in FIG. 2.

In operation, if the shutter 10 is in the position illustrated in FIG. 2, an extrusion T is formed by the extrusion head 1 with a cross-section having the profile of the portion shown in FIG. 3. This extrusion, viewed in section, has a substantially rectangular profile with a sealing tab 15 projecting from its lower side and three further tabs 16–18 projecting from the upper side thereof.

If instead the shutter 10 is in the position illustrated in broken outline in FIG. 2, the profile of the extrusion T is that shown in FIG. 4, that is, without the tab 15.

When the shutter 10 is located, by means which will be described below, in an intermediate position between the two described above, the profile of the extrusion T obtained will generally be of the type shown in FIG. 5, that is, with a tab 15 which is less pronounced or smaller.

The extrusion head 1 thus allows the continuous extrusion of an extrusion T of the type shown by way of example in FIG. 1, that is, having successive portions $L_1$, $L_2$ and $L_3$ of predetermined length, each having a respective predetermined section.

If the extrusion T is a weather strip intended to be fitted to the periphery of an object or aperture, it is extremely important that the variations in section are achieved effectively at the desired points, in order to ensure perfect coupling between the strip and the periphery of the object or aperture and thus to ensure improved sealing and/or better aesthetic results.

In other words, it is necessary for the displacement of the shutter 10 to be synchronised with the advance of the extrusion T.

In order to achieve the synchronisation, according to the invention a tracer member indicated 0 in FIG. 1 is used, which has an elongate form and is constituted by a material that is substantially inextensible or extensible to a foreseeable extent.

The member 0, constituted for example by a strip, is fed to the extrusion head 1 simultaneously with the material to be extruded so that the member is incorporated in the extrusion T during extrusion, as shown in FIG. 1.

The member 0, constituted for example by a strip, is guided in the direction of arrow D towards the inlet aperture 7 of the extrusion head 1 by means of two pairs of opposing guide rollers R.

A detector device, indicated 20, is located close to or in contact with the member 0 upstream of the extrusion head 1 and is intended to output electrical signals indicative of the length of the member 0 which has passed in front of this detector.

If the signals output by the detector are of analogue type they may possibly be converted to digital signals by means of an analogue/digital converter 21 and then input to an electronic processing and control unit, generally indicated 22. This unit may be formed by means of microprocessors.

The electronic processing and control unit 22 controls the operation of a drive motor 23, for example a direct current motor. The shaft 23a of the latter has threading which engages in a circulating ball bush 24 to which one end of a shaft 25 is connected, the other end thereof being connected to the shutter 10.

To the electric motor 23 are connected a tachometric dynamo 26 and a position sensor 27, for example a rotary optical encoder. The tachometric dynamo 26 feeds the processing and control unit 22 with signals indicative of the rate of rotation of the shaft of the electric motor 23. The position sensor 27 feeds the unit with signals indicative of the angular position of the shaft of the motor 23 and hence of the position of the shutter 10 relative to the outlet orifice 6 of the extrusion die 5.

An input/output unit, indicated 28, is connected to the electronic processing and control unit 22 by means of an interface device 29.

By means of the input/output unit 28, an operator may set the length value $L_i$ of each of the portions of the extrusion T characterised by respective cross-sections. Moreover, by means of this input/output unit, the operator may set in parameters arranged to define the various positions which the shutter 10 (or shutters in general in the case of extrusion dies arranged to allow several types of sectional variation) must take up during operation to give the individual portions of the extrusion T the desired cross-sections.

In operation, the advance of the extrusion T is controlled by the detection of the advance of the member 0 which advances together with the extrusion. This detection, as stated, is carried out by means of the detector device 20.

The electronic processing and control unit 22 is programmed by conventional methods to operate the electric motor 23 in a predetermined manner in dependence on the signals receive from the detector 20 and in dependence on controls imparted by the operator through the input/output unit 28.

The tracer member 0 may be formed in various manners.

As shown in FIGS. 6 to 8, this member may be made in strip form, being provided with detectable marks or references spaced longitudinally thereof.

These marks or references may be constituted by variations in the form or section of the strip. In FIG. 6 these variations in form are constituted by circular apertures 30 which may be detected by means of a detector device 20 of optical, pneumatic or mechanical type through a feeler device.

The reference of the strip may also be constituted by modifications to the profile of the edge of the strip, as shown for example in FIG. 7. In this Figure, an edge of the strip 0 has a succession of notches 31 which are equi-spaced from each other and between adjacent pairs of which teeth 32 are defined. The notches 31 or the teeth 32 may be detected by means of optical, pneumatic or mechanical devices.

The marks or references of the strip acting as the tracer member 0 may be constituted by detectable marks of the type indicated 33 in FIG. 8. These detectable marks may be formed by treating longitudinally equi-spaced portions of the strip with fluorescent substances or substances having magnetic or radioactive characteristics. Correspondingly, the detector device used will be an optical sensor, a magnetic sensor or radiation sensors.

Alternatively, the marks 33 could be constituted by layers of metallic material applied to the strip by silk-screen printing and detectable electrically, magnetically or optically.

Further embodiments of the tracer member 0 are shown in FIGS. 9 and 10. In FIG. 9, the member 0 is constituted by a strand (thread) and the detector device is constituted by a wheel 40 rotatably mounted about an axis perpendicular to the direction D of advance of the strand, in contact with the strand, so that the latter causes the wheel to rotate to an extent proportional to its advance. The wheel 40 may be provided with marks 41, for example of magnetic type, the passage of which at a reference position may be detected by means of a conventional sensor 42.

Alternatively, as shown in FIG. 10, the tracer member 0 may be constituted by a strand also carrying detectable marks or references 50 regularly spaced therealong. These marks or references 50 may also be formed by treating the strand with a fluorescent, magnetic, or radioactive substance or by metallizing surface portions of the strand.

According to the nature of the references, the detector device 20 is constituted by a known detector adapted to detect the type of reference used.

When the member 0 is constituted by a strip, this strip may, for example, be of paper, woven material, a polymeric material (for example, polypropylene), or again of a metallic material.

If the member 0 is constituted by a strand, however, this may, for example, be a thread or a wire.

In some weather strips intended for use in motor vehicles a rigid reinforcement or core in the form of a strip, usually metal, is embedded in the elastomeric material during extrusion. Two examples of such reinforcing strips are shown in FIGS. 11 and 12.

Conveniently, in order to make such strips with successive portions of predetermined length, each having a respective predetermined section, the reinforcement intended to be embedded in the extrusion may be used as the tracer member 0.

The reinforcement shown in FIG. 11 is in strip form and has a plurality of apertures 60 regularly spaced therealong. These apertures may be detected by means of a pneumatic, optical or magnetic detector. A pneumatic sensor developed by the Applicant and which forms the subject of a patent application filed together with the present application is particularly useful for such detection.

The reinforcement shown in FIG. 12 is constituted by a woven strip made by warp threads 70 (yarns) and a wire weft 80 (of metal) having a serpentine path. This type of reinforcement also lends itself to use as the tracer member 0, the advance of which may be detected by means of an encoder comprising a wheel arranged to be rotated by friction as a result of the advance of the strip.

With the process and the apparatus according to the invention, it is possible to obtain variations in the cross section of the extrusion very precisely at desired points.

Naturally, both the process and the apparatus are suitable not just for obtaining the variations in section shown by way of example in FIGS. 3 to 5.

Moreover, it is not intended that the invention should be limited to a single type of variation to the section of the extrusion, since the possibility of providing and coordinating any desired number of types of variation falls within its scope, for example, providing and coordinating the operation of a plurality of shutter members or like devices arranged individually to cause a particular and different type of variation of the section of the extrusion orifice.

I claim:

1. A method for the continuous extrusion of an extrusion, such as a weather strip for motor vehicle bodies, having successive portions of predetermined length with respective predetermined sections, using an extrusion head with an extrusion orifice and adjusting means which, when activated, modify the section of the extrusion orifice, wherein the method comprises the following operations:
feeding an elongate member having reference means regularly spaced along the length thereof to the extrusion head simultaneously with the material to be extruded so that the member is incorporated in said extrusion during extrusion;
detecting the advance of said member upstream of said extrusion head by detecting the passage of said reference means, and synchronising the operation of said adjusting means with the advance of said member to adjust said extrusion orifice upon the passage of a predetermined length of said member.

2. A method according to claim 1, wherein the member comprises a strip.

3. A method according to claim 1, wherein the member comprises at least one strand.

4. A method according to claim 3, wherein the strand is a thread.

5. A method according to claim 1, for forming an extrusion of the type including a rigid strip reinforcement which is incorporated in the extrusion during extrusion, wherein the reinforcement has a plurality of reference means spaced regularly along it and constitutes the member whose advance is detected, and wherein the activation of said adjusting means is synchronised with the advance of the reinforcement.

6. A method according to claim 1, for forming an extrusion of the type including a reinforcement comprising a woven material formed by at least partly from metal wire incorporated in the extrusion during extrusion, wherein said reinforcement constitutes the member whose advance is detected, and wherein the operation of said adjusting means is synchronised with the advance of the reinforcement.

* * * * *